(12) United States Patent
DeMello et al.

(10) Patent No.: US 7,318,236 B2
(45) Date of Patent: Jan. 8, 2008

(54) TYING A DIGITAL LICENSE TO A USER AND TYING THE USER TO MULTIPLE COMPUTING DEVICES IN A DIGITAL RIGHTS MANAGEMENT (DRM) SYSTEM

(75) Inventors: Marco A. DeMello, Redmond, WA (US); Vinay Krishnaswamy, Woodinville, WA (US); Rushmi U. Malaviarachchi, Bellevue, WA (US); John L. Manferdelli, Redmond, WA (US); Bradley Serbus, Seattle, WA (US); Attila Narin, Bothell, WA (US); Steve Bourne, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 779 days.

(21) Appl. No.: 10/375,246

(22) Filed: Feb. 27, 2003

(65) Prior Publication Data

US 2004/0172533 A1  Sep. 2, 2004

(51) Int. Cl.
*G06F 7/04* (2006.01)
*H04L 9/00* (2006.01)
*H04Q 40/00* (2006.01)

(52) U.S. Cl. .................. 726/26; 713/167; 705/51; 380/279

(58) Field of Classification Search .............. 705/1, 705/51–54; 713/167; 726/26, 18; 380/279
See application file for complete search history.

(56) References Cited

U.S. PATENT DOCUMENTS

| | | | | |
|---|---|---|---|---|
| 5,629,980 A | * | 5/1997 | Stefik et al. ............... | 705/54 |
| 5,699,431 A | * | 12/1997 | Van Oorschot et al. ....... | 380/30 |
| 5,715,403 A | * | 2/1998 | Stefik ...................... | 395/244 |
| 6,002,772 A | * | 12/1999 | Saito ......................... | 705/58 |
| 6,073,124 A | * | 6/2000 | Krishnan et al. ............. | 705/59 |
| 6,226,618 B1 | * | 5/2001 | Downs et al. ............... | 705/1 |
| 6,301,660 B1 | * | 10/2001 | Benson ..................... | 713/165 |
| 6,728,379 B1 | * | 4/2004 | Ishibashi et al. ............ | 380/278 |
| 6,898,706 B1 | * | 5/2005 | Venkatesan et al. ........ | 713/167 |
| 6,915,425 B2 | * | 7/2005 | Xu et al. ..................... | 713/165 |
| 6,920,565 B2 | * | 7/2005 | Isaacson et al. ............ | 713/193 |
| 6,993,137 B2 | * | 1/2006 | Fransdonk .................. | 380/279 |
| 7,239,708 B2 | * | 7/2007 | England et al. ............. | 380/269 |
| 2002/0013772 A1 | * | 1/2002 | Peinado ..................... | 705/51 |
| 2002/0049679 A1 | * | 4/2002 | Russell et al. ............... | 705/52 |
| 2002/0099663 A1 | * | 7/2002 | Yoshino et al. ............. | 705/65 |
| 2002/0108049 A1 | * | 8/2002 | Xu et al. ..................... | 713/193 |
| 2002/0184515 A1 | * | 12/2002 | Oho et al. .................. | 713/193 |
| 2003/0023564 A1 | * | 1/2003 | Padhye et al. ............... | 705/54 |
| 2003/0084306 A1 | * | 5/2003 | Abburi et al. ............... | 713/188 |
| 2003/0187801 A1 | * | 10/2003 | Chase et al. ................ | 705/59 |
| 2004/0054920 A1 | * | 3/2004 | Wilson et al. ............... | 713/200 |
| 2004/0127196 A1 | * | 7/2004 | Dabbish et al. ............. | 455/411 |

FOREIGN PATENT DOCUMENTS

| | | | |
|---|---|---|---|
| WO | WO 00/58811 | * | 10/2000 |
| WO | WO 00/59150 | * | 10/2000 |
| WO | WO 01/52021 A1 | * | 7/2001 |

OTHER PUBLICATIONS

Evans, P. "DRM: Is the Road to Adoption Fraught with Potholes?" *Seybold Reporting Analyzing Publishing Technologies*, 2001, 1(14), 32.

(Continued)

*Primary Examiner*—Emmanuel L. Moise
*Assistant Examiner*—Techane J. Gergiso
(74) *Attorney, Agent, or Firm*—Woodcock Washburn LLP

(57) ABSTRACT

A first trusted component on a first computing device performs cryptography, evaluation, and enforcement and is tied thereto, and a first user-machine certificate associated with the first computing device is tied to a user. Correspondingly, a second trusted component on a second computing device performs cryptography, evaluation, and enforcement and is tied thereto, and a second user-machine certificate associated with the second computing device is also tied to the user. The first trusted component obtains the content for rendering on the first computing device by way of the first user-machine certificate and the license, and the second trusted component obtains the content for rendering on the second computing device by way of the second user-machine certificate and the same license.

16 Claims, 6 Drawing Sheets

OTHER PUBLICATIONS

Fowler, T.B. "Technology's Changing Role in Intellectual Property Rights", *IT Professional(IEEE)*, 2002, 4(2), 39-44.

Gable, J. "The Digital Rights Conundrum", *Transform Magazine*, 2001, 10(11), 27.

Griswold, G.N. "A Method for Protecting Copyright on Networks", *IMA Intell. Property Project Proceedings*, Jan. 1994, 1(1), 169-178.

Gunter, C.A., et al. "Models and Languages for Digital Rights", *Proceedings of the 34th Annual Hawaii International Conference on System Sciences*, 2001, 5.

Kahn, R.E. "Deposit, Registration and Recordation in an Electronic Copyright Management System", *IMA Intellectual Property Project Proceedings*, Jan. 1994, 1(1), 111-120.

Peinado, M. "Digital rights management in a multimedia environment", *SMPTE Journal*, 2002, 111(3), 159-163.

Royan, B. Content creation and rights management; experiences of SCRAN(the Scottish Cultural Resources Access Network), *Program*, 2000, 34(2), 131-142.

Valimaki, M. et al., "Digital rights management on open and semi-open networks", *WIAPP*, 2001, 154-155.

Yu, H. "Digital multimedia at home and content rights management", *IEEE, Proceedigns 2002 IEEE 4th International Workshop on Networked Appliances*, 2002, 49-56.

"Managing digital rights in online publishing", *Information Management & Technology*, 2001, 34(4), 168-169.

Hwang, C. et al., "Protection of Digital Contents on Distributed Multimedia Environment", *Proceedings of the IASTED International Conference, Internet and Multimedia Systems and Applications*, Nov. 19-23, 2000, Las Vegas, Nevada, USA, pp. 127-132.

Hong, S. et al., "On the construction of a powerful distributed authentication server without additional key management", *Computer Communications*, 2000, 23, 1638-1644.

Managing Digital Rights in Online Publishing, "How two publishing houses maintin control of copyright" *Information Management & Technology*, 2001, 34(4), 168-169.

Jakobsson, M. et al., "Proprietary Certificates", *Topics in Cryptology*, 2002, 164-181.

Kumik, P. "Digital Rights Management", *Computers and Law*, 2000, 11(4), 14-15.

Torrubia, A. et al., "Cryptography regulations for E-commerce and digital rights management", *Computers & Security*, 2001, 20(8), 724-738.

Zwollo, K. "Digital document delivery and digital rights management", *Information Services & Use*, 2001, 9-11.

\* cited by examiner

TYING A DIGITAL LICENSE TO A USER AND TYING THE USER TO MULTIPLE COMPUTING DEVICES IN A DIGITAL RIGHTS MANAGEMENT (DRM) SYSTEM

CROSS-REFERENCE TO RELATED APPLICATIONS

The following U.S. Patent Applications disclose subject matter that is related to the subject matter of the present application, and are hereby incorporated herein by reference in their entirety:

U.S. patent application Ser. No. 10/185,527, filed Jun. 28, 2002 under attorney docket number MSFT-1330 and entitled "Obtaining a Signed Rights Label (SRL) for Digital Content and Obtaining a Digital License Corresponding to the Content Based on the SRL in a Digital Rights Management System";

U.S. patent application Ser. No. 10/185,278, filed Jun. 28, 2002 under attorney docket number MSFT-1333 and entitled "Using a Rights Template to Obtain a Signed Rights Label (SRL) for Digital Content in a Digital Rights Management System";

U.S. patent application Ser. No. 10/185,511, filed Jun. 28, 2002 under attorney docket number MSFT-1343 and entitled "Systems And Methods For Issuing Usage Licenses For Digital Content And Services";

U.S. patent application Ser. No. 09/290,363 filed Apr. 12, 1999 and entitled "ENFORCEMENT ARCHITECTURE AND METHOD FOR DIGITAL RIGHTS MANAGEMENT"; and U.S. Provisional Application No. 60/126,614, filed Mar. 27,1999 and entitled "ENFORCEMENT ARCHITECTURE AND METHOD FOR DIGITAL RIGHTS MANAGEMENT"

TECHNICAL FIELD

The present invention relates to a system such as a digital rights management (DRM) system for enforcing rights in digital content. More specifically, the present invention relates to such an enforcement system that allows access to encrypted digital content on a computing device only in accordance with parameters specified by license rights acquired by a user of the digital content. Even more specifically, the present invention relates to providing a digital license that is tied to a user and tying the user to one or more computing devices.

BACKGROUND OF THE INVENTION

As is known, and referring now to FIG. 1, digital rights management (DRM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14 or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A DRM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based DRM system 10 allows an owner of digital content 12 to specify license rules that must be satisfied before such digital content 12 is allowed to be rendered on a user's computing device 14 and also during usage of such content 12. Such license rules can include the aforementioned temporal requirement, and may be embodied within a digital license 16 that the user/user's computing device 14 (hereinafter, such terms are interchangeable unless circumstances require otherwise) must obtain from the content owner or an agent thereof. Such license 16 also includes the decryption key (KD) for decrypting the digital content, perhaps encrypted according to a key decryptable by the user's computing device, and is signed by the license issuer. Because the content 12 requires the license 16 for access thereto, then, the content 12 may be freely distributed. Significantly, the license 16 must somehow be bound or 'tied' either directly or indirectly to a computing device 14 on which the content 12 is to be rendered. Otherwise, the license 16 could potentially be copied to an infinite number of other devices 14 to render the corresponding content 12 thereon, also.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license 16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the DRM system 10 to carry out the wishes of the owner of the digital content 12 according to the rules and requirements in the license 16, and the user should not be able to easily alter such trusted element for any purpose, nefarious or otherwise. Of necessity, the trusted component 18 has knowledge of the external entities trusted to issue licenses and can certify the identity of various entities such as the external entities, users, applications, and machines.

As should be understood, the rules and requirements in the license 16 can specify whether the user has rights to render the digital content 12 based on any of several factors, including who the user is, where the user is located, what type of computing device the user is using, what rendering application is calling the DRM system, the date, the time, etc. In addition, the rules and requirements of the license 16 may limit the license 16 to a pre-determined number of uses, plays, or pre-determined play time, for example. The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 20 determining that the license 16 is valid and that the user satisfies the rules and requirements therein, the digital content 12 can then be rendered. In particular, to render the content 12, the decryption key (KD) is obtained from the license 16 and is applied to (KD (CONTENT)) from the content package 13 to result in the actual content 12, and the actual content 12 is then in fact rendered. The trusted component 18 may also need to verify and track dynamic aspects of the environment of the computing device 14 such as the application doing the content rendering.

Typically, to perform cryptographic functions in the connection with the trusted component 18, including the aforementioned applying of (KD) to (KD(content)) and all other cryptographic functions, the trusted component 18 has a black box 22. As with the license evaluator 20, the black box 22 is trusted in the DRM system 10 to carry out the wishes of the owner of the digital content 12 according to the rules and requirements in the license 16, and the user should not be able to easily alter such trusted element for any purpose, nefarious or otherwise. It is also the job of the black box 22 to act as a license enforcer, and in particular to insure that content 12 is only decrypted and delivered to appropriate rendering code in the user's computing device 14.

Typically, the black box 22 can be expected to perform both symmetric (single key) and asymmetric (public-private key pair) cryptographic encryption and/or decryption. In particular, the aforementioned decryption key (KD) is typically a symmetric key and is therefore transmitted in an encrypted form by being encrypted by another symmetric key or a public key or private key. Thus, to decrypt (KD (content)), and if for example it is the case that (KD) is encrypted by a public key (PU) (i.e., (PU(KD))), the black box 22 must first obtain the private key (PR) corresponding to (PU) and asymmetrically apply (PR) to (PU(KD)) to result in (KD), and then must symmetrically apply (KD) to (KD(content)) to result in the content.

The black box 22 is provided with a secret and is entrusted to not reveal the secret to anybody or anything. Thus, the secret is the basis for encrypting the content key (KD), either directly or indirectly, and only the black box 22 as the bearer of the secret can decrypt the content key (KD). Thus, the license 16 having (KD) encrypted according to the secret is tied or bound to the black box 22 thereby. Typically, the secret is the private key (PR-BB) of a key pair (PU-BB, PR-BB) that is unique or nearly unique to the black box 22, and the corresponding public key (PU-BB) of the black box 22 is employed to encrypt (KD), either directly or indirectly. Of paramount importance, the black box 22 must be able to hide (PR-BB) and protect same and related cryptographic code from observation and tampering, and (PR-BB) and such code are therefore embedded or encapsulated in the black box 22, with appropriate obfuscation and self-protection.

In order to prevent unrestricted duplication, the black box 22 is tied to one particular hardware machine. Typically, such tying is achieved by hard coding machine properties into the black box 22 and authenticating such machine properties at run time. The black box 22 is also entrusted to cryptographically authenticate other software components, typically by verifying proffered digital signatures, and thus can ensure that other components of the trusted system 18 on the user's computing device 14 and that proffered items such as licenses 16 have not been tampered with.

Typically, each black box 22 is accompanied by a digital black box certificate bearing (PU-BB), a unique ID, a version number, and perhaps other certificate contents. The black box certificate is thus tied to the black box 22 through the correspondence of (PU-BB) and (PR-BB). An issuer of a license 16 can decide to accept or reject a request for a license 16 from the trusted component 18 based on the certificate of the black box 22 thereof and the contents therein. In the event that a request is rejected based on the black box certificate, a newer black box 22 with a corresponding newer black box certificate typically must be installed before the request is accepted. Of course, a new black box 22 may be installed for other reasons, may be initially installed separate from the installation of the remainder of the trusted component 18, may be installed with the remainder of the trusted component but not activated, etc.

As was set forth above, a DRM license 16 must somehow be tied either directly or indirectly to a computing device 14 on which the corresponding content 12 is to be rendered. While direct tying to a particular computing device 14 is simpler, it may be the case that the user of the particular computing device 14 also has other computing devices 14 and may wish to render the content 12 based on the license on such other computing devices 14. For example, a user may wish to render a musical work both on a desktop computer at a home or office and on a portable computer. Thus, a need exists for a method and mechanism to tie a digital license 16 to a user rather than a particular computing device 16. More particularly, a need exists for a method and mechanism to tie a digital license 16 to a digital object representative of the user, such as a user certificate.

Of course, a user with such a user object/certificate could copy the user object/certificate and the license 16 to an infinite number of other computing devices 14 to render the corresponding content 12 thereon. Accordingly, a need exists for a method and mechanism to tie a user by way of a user object/certificate therefor to each of a plurality of particular computing devices 14, while at the same time restricting the number of particular computing devices 14 to which any particular user object/certificate is tied to. Thus, a license 16 would be tied to each of a plurality of computing devices 14.

SUMMARY OF THE INVENTION

The aforementioned needs are satisfied at least in part by the present invention in which a DRM system allows a user to render digital content on a plurality of computing devices according to a corresponding digital license, where the license is tied to the content and to the user.

In the system, a first trusted component on a first one of the computing devices performs cryptography and DRM evaluation and enforcement for the first one of the computing devices and is tied thereto, and a first user-machine certificate associated with the first one of the computing devices is tied to the user. Correspondingly, a second trusted component on a second one of the computing devices performs cryptography and DRM evaluation and enforcement for the second one of the computing devices and is tied thereto, and a second user-machine certificate associated with the second one of the computing devices is also tied to the user. Thus, the first trusted component can obtain the content for rendering on the first one of the computing devices by way of the first user-machine certificate and the license, and the second trusted component can obtain the content for rendering on the second one of the computing devices by way of the second user-machine certificate and the same license.

To providing a user-machine certificate, a request is received from the user for the user-machine certificate with regard to a particular computing device, where the request includes an identification (ID) of the user and a computing device certificate associated with the computing device. The computing device certificate includes a public key (PU-x) associated therewith. Based on the ID of the user it is determined whether the user has a record in a user-machine database. If not, the record for the user is created in the database, including the ID of the user and a public key/ private key pair for the user (PU-USER, PR-USER). If so, the record for the user in the database is located. (PU-x) is obtained from the computing device certificate, (PR-USER) is encrypted according to (PU-x) to result in (PU-x(PR-USER)), and (PU-USER) and (PU-x(PR-USER)) are formed into the to-be-provided user-machine certificate. The formed user-machine certificate is then returned to the user.

Presuming that the content is encrypted according to a content key (KD) to result in (KD(content)), the license includes (KD) encrypted according to (PU-USER) to result in (PU-USER(KD)), and a trusted component of the computing device has a private key (PR-x) corresponding to (PU-x), the trusted component can decrypt the content for rendering on the computing device by applying (PR-x) to (PU-x(PR-USER)) from the user-machine certificate to obtain (PR-USER), applying (PR-USER) to (PU-USER (KD)) from the license to obtain (KD), and applying (KD) to (KD(content)) to obtain the content.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
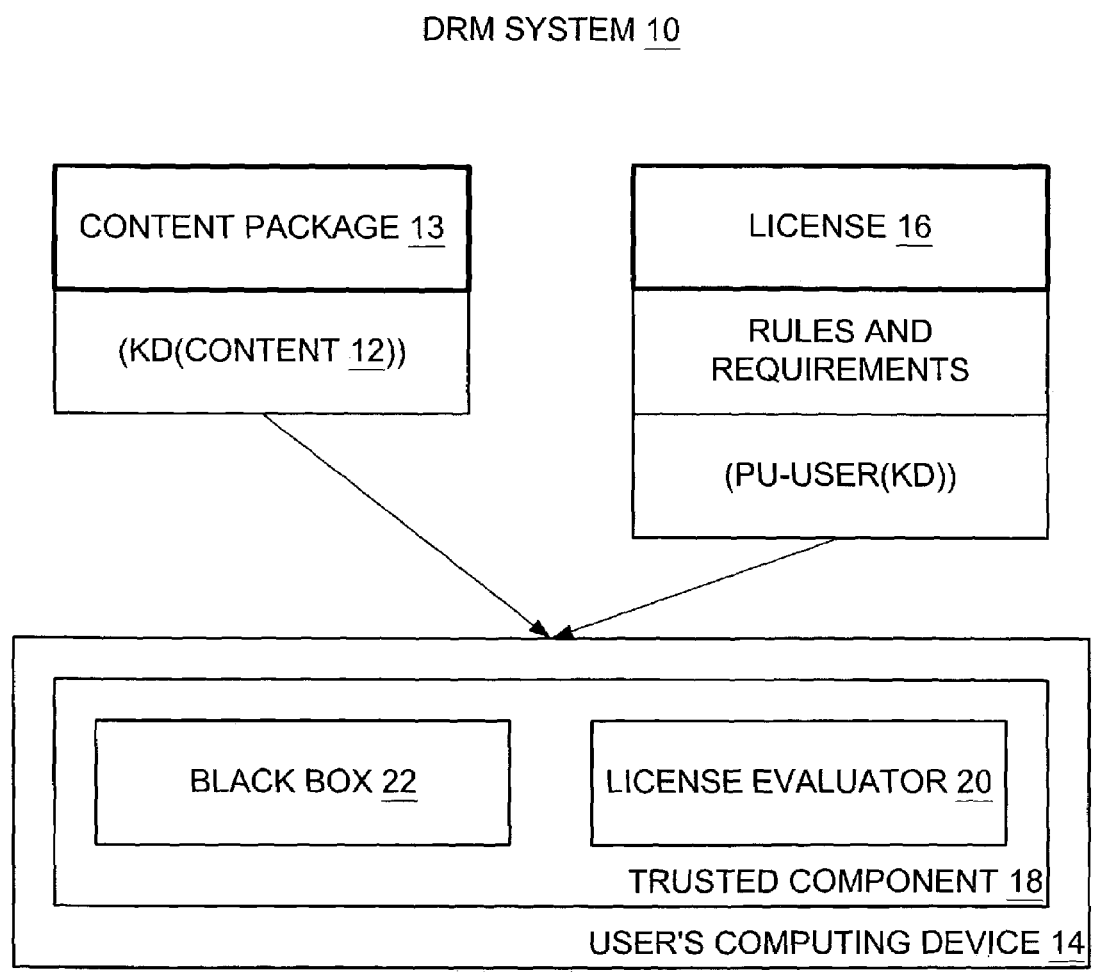
FIG. 1 is a block diagram showing an enforcement architecture of an example of a trust-based system.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
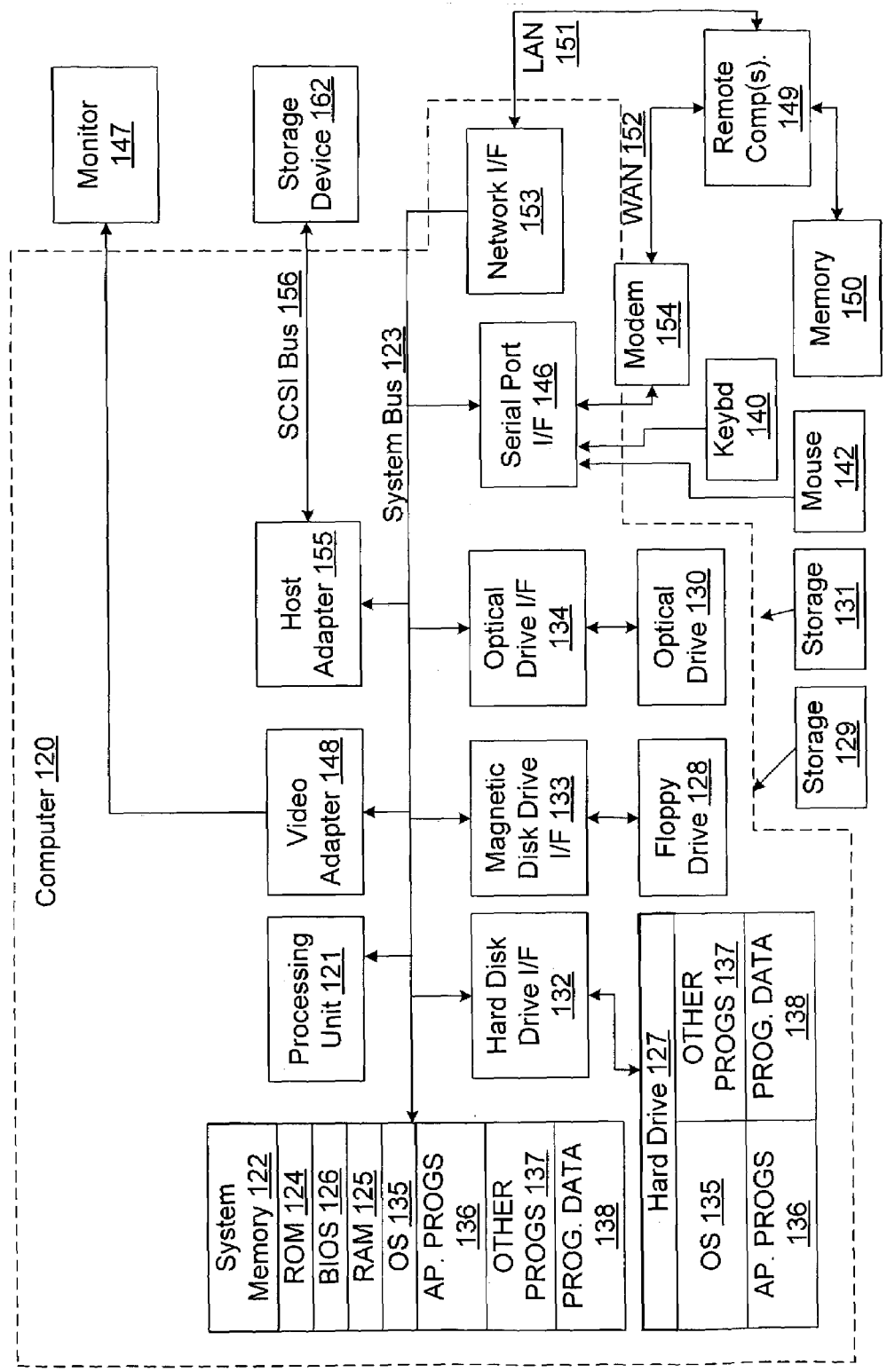
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet. The personal computer 120 may also act as a host to a guest such as another personal computer 120, a more specialized device such as a portable player or portable data assistant, or the like, whereby the host downloads data to and/or uploads data from the guest, among other things.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Tying Black Box 22 to Computing Devise 14

Figure 3:
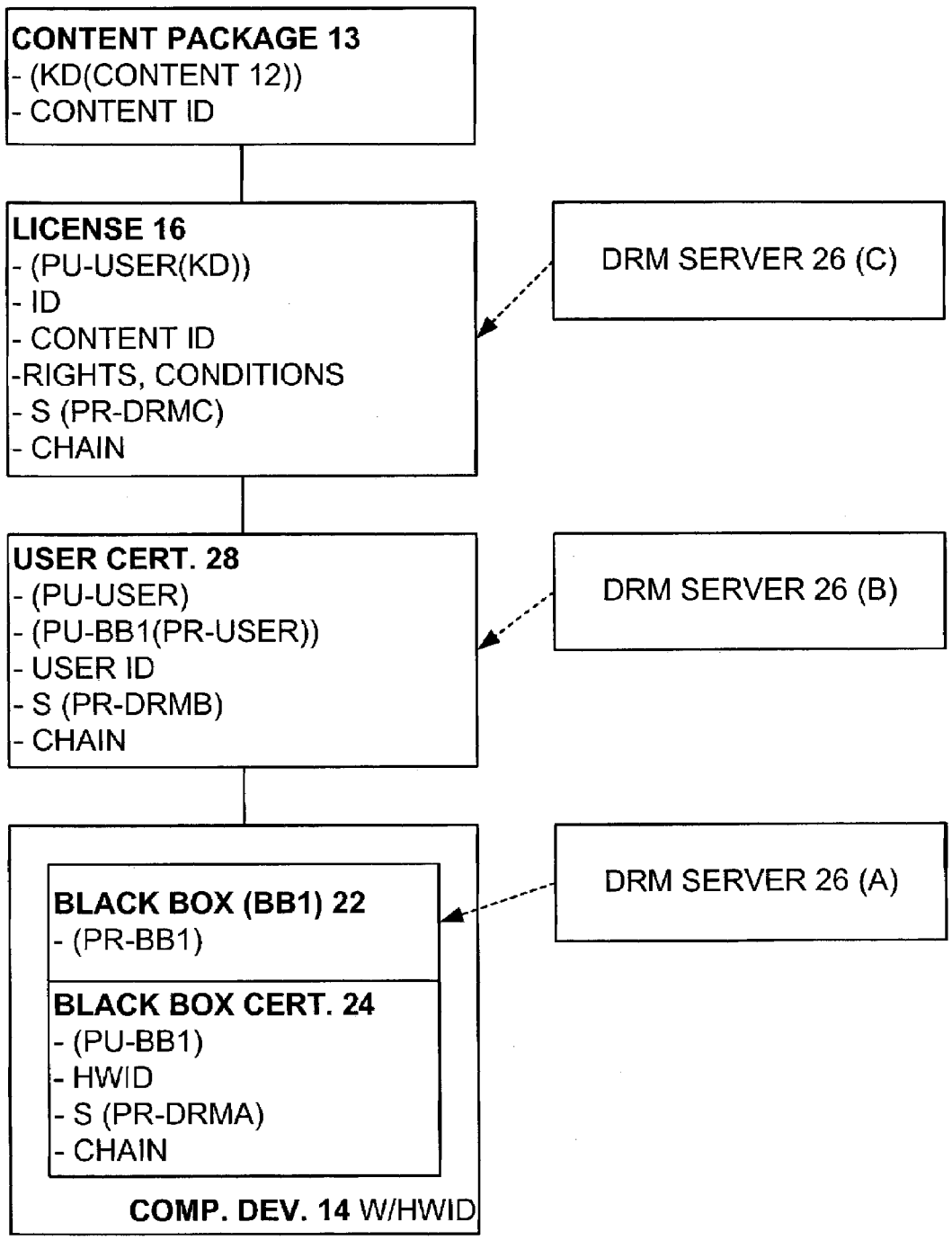
FIG. 3 is a block diagram showing content tied to a license, the license tied to a user certificate, the user certificate tied to a black box, and a black box tied to a computing device in connection with the architecture of FIG. 1.

As was set forth above, in the DRM system, each computing device 14 is provided with a black box 22 to perform cryptography and DRM enforcement functions. Turning now to FIG. 3, it is seen that in one embodiment of the present invention, the black box 22 for each computing device 14 is provided with a unique public key/private key pair (PU-BBx, PR-BBx) for performing asymmetric encryption and decryption therewith. In particular, (PR-BBx) is embedded or encapsulated in the black box 22, with appropriate obfuscation and self-protection, and (PU-BBx) is provided in a corresponding black box certificate 24 that is issued in conjunction with the issuance of the black box 22 by an appropriate DRM server 26. As was set forth above, the black box certificate 24 is tied to the black box 22 through the correspondence of (PU-BB) and (PR-BB).

In order to prevent unrestricted duplication, the black box 22 is tied to the computing device 14 thereof by hard coding machine properties into the black box 22 and authenticating such machine properties at run time. Typically, the machine properties are one or more indicia from the computing device 14 encoded into a hardware ID (HWID) that uniquely identifies the computing device 14.

As should be appreciated, then, the black box certificate 24 includes therein the HWID of the computing device 14 in addition to (PU-BBx). The black box certificate 24 may also include therein a unique ID for the black box 22, a version number of the black box 22, and perhaps other certificate contents relevant to the black box 22.

The black box certificate 24 is signed by a private key of the DRM server 26 that issued the black box 22 and black box certificate 24 (PR-DRMx). The signature is based on a hash of at least a portion of the contents of the black box certificate 24, and verifies by application of the corresponding public key (PU-DRMx). If the contents are altered, the signature will not verify. Typically, the black box certificate 24 as issued by the issuer includes a chain of certificates leading back to a root certificate from a trusted root authority.

To summarize, then, for each computing device 14 in the DRM system 10, the black box 22 thereof is tied thereto by way of a HWID based on indicia from the computing device 14, and the black box certificate 24 is tied to the black box by way of (PU-BBx) and (PR-BBx) and also by including therein the HWID.

Tying a User to Black Box 22 On a Computing Devise 14

In one embodiment of the present invention, and still referring to FIG. 3, a user is provided with a digital object representative of the user to tie such user to the black box 22 on a particular computing device. In particular, the digital object is a digital user certificate 28 or the like that includes therein a unique public key/private key pair (PU-USER, PR-USER) for performing asymmetric encryption and decryption therewith. Significantly, (PR-USER) in the user certificate 28 is encrypted according to the black box public key (PU-BBx) to result in (PU-BBx(PR-USER)). Accordingly, only the black box 22 having the corresponding (PR-BBx) can obtain (PR-USER), by applying (PR-BBx) to (PU-BBx(PR-USER)) to expose such (PR-USER). Thus, the user is tied by way of (PU-BBx(PR-USER)) in the user certificate 28 of such user to the black box 22 having the corresponding (PR-BBx).

Of course, (PU-USER) as a public key may be placed in the user certificate 28 without encryption if so desired. The user certificate 24 may also include therein a unique ID, and perhaps other certificate contents relevant to the user such as for example a system ID for the user. The user certificate 28 is signed by a private key of the DRM server 26 that issued such user certificate 28 (PR-DRMx), which may or may not be the DRM server 26 that issued the black box certificate 24 and black box 22. As before, the signature is based on a hash of at least a portion of the contents of the user certificate 28, and verifies by application of the corresponding public key (PU-DRMx). If the contents are altered, the signature will not verify. Typically, and as before, the user certificate 28 as issued by the issuer includes a chain of certificates leading back to a root certificate from a trusted root authority.

To summarize, then, a particular user certificate 28 is tied to a particular black box 22 that owns (PR-BBx) by way of having (PU-BBx(PR-USER)) therein, and the particular black box 22 is tied to a particular computing device 14. Accordingly, such particular user certificate 28 is tied to the particular computing device 14 and is usable only in association therewith.

Tying a License 16 to a User

In one embodiment of the present invention, and still referring to FIG. 3, a license 16 corresponding to a piece of content 12 is tied to a particular user by way of the user certificate 28 thereof. Specifically, the license 16 includes a symmetric key (KD) by which the corresponding content 12 is encrypted (and by which the content 12 is tied to the license 16), where (KD) in the license 16 is encrypted according to the user public key (PU-USER) to result in (PU-USER(KD)). Accordingly, only the user and user certificate 28 having the corresponding (PR-USER) can obtain (KD), by applying (PR-USER) to (PU-USER(KD)) to expose such (KD). Of course, the black box 22 would perform the actual cryptographic functions on behalf of the user. Thus, the license 16 is tied by way of (PU-USER(KD)) therein to the user and user certificate 28 having the corresponding (PR-USER).

As was set forth above, the license 16 may also include therein a unique ID, and perhaps other license contents relevant to rendering the corresponding content 12, such as for example a content ID for the content 12, user rights, and terms and conditions that must be satisfied before the content 12 may be decrypted and rendered. Once again, the license 16 is signed by a private key of the DRM server 26 that issued such license 16 (PR-DRMx), which may or may not be the DRM server 26 that issued the black box certificate 24 and black box 22 or the user certificate 28. As before, the signature is based on a hash of at least a portion of the contents of the license 16, and verifies by application of the corresponding public key (PU-DRMx). If the contents are altered, the signature will not verify. Typically, and as before, the license 16 as issued by the issuer includes a chain of certificates leading back to a root certificate from a trusted root authority.

To summarize, then, a particular license 16 is tied to a particular user and user certificate 28 thereof that owns (PR-USER) by way of having (PU-USER(KD)) therein, the particular user certificate 28 is tied to a particular black box 22 that owns (PR-BBx) by way of having (PU-BBx(PR-USER)) therein, and the particular black box 22 is tied to a particular computing device 14. Accordingly, such particular license 16 is tied to the particular computing device 14 and it would appear thus far that such particular license 16 is usable only in association with the particular computing device 14. However, and as is set forth in more detail below, in one embodiment of the present invention, the particular license 16 may be usable in association with a plurality of particular computing devices 14.

Tying a User to Multiple Computing Devises 14

Figure 4:
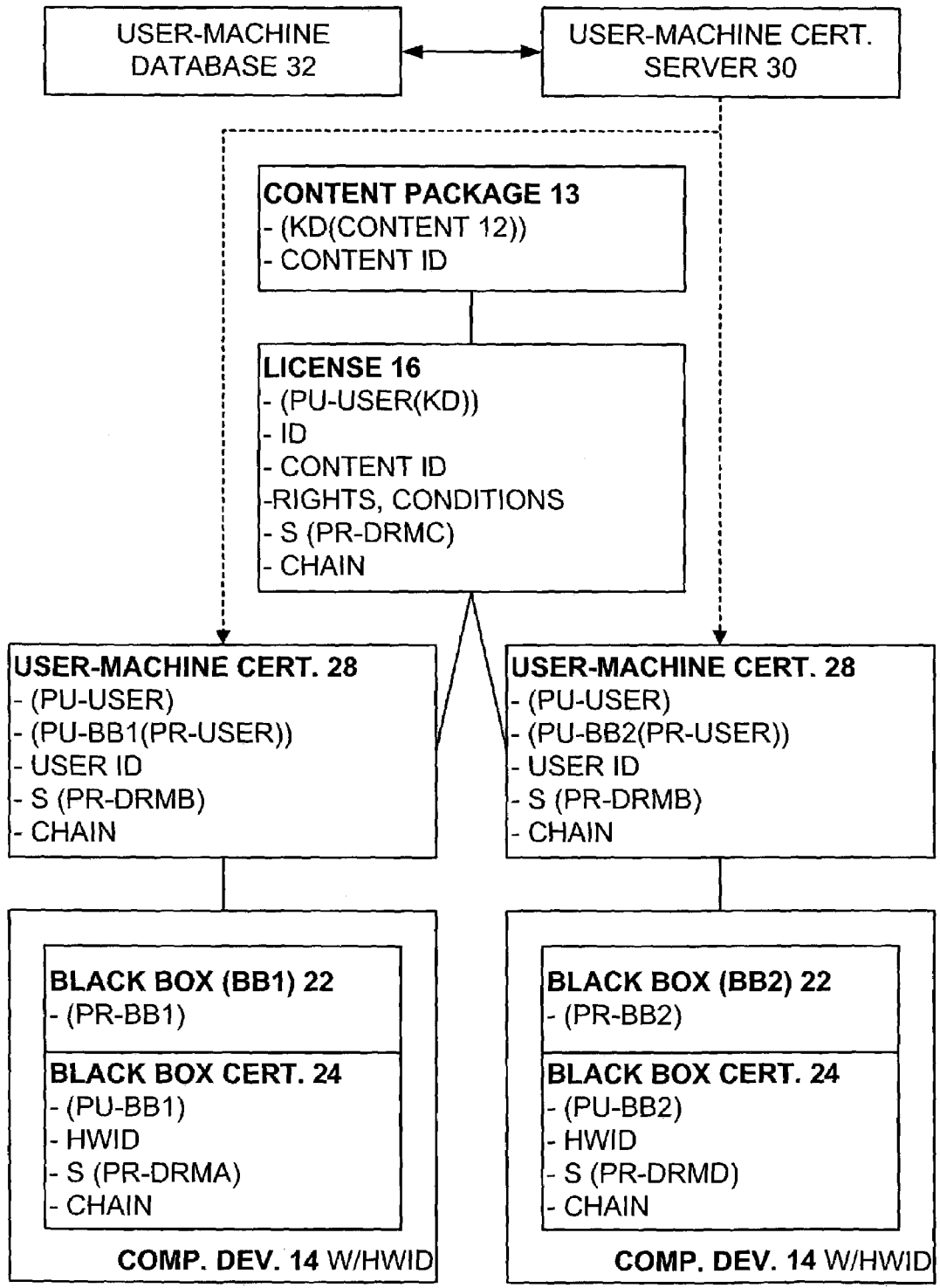
FIG. 4 is a block diagram showing content tied to a license, the license tied to a plurality of user-machine certificates, each user-machine certificate tied to a black box, and each black box tied to a computing device in accordance with one embodiment of the present invention.

In one embodiment of the present invention, and turning now to FIG. 4, the user certificate 28 provided to the user is a user-machine certificate 28 based on a public key/private key pair (PU-USER, PR-USER) that is unique to the user and tied to a particular computing device 14 by way of the black box 22 thereon. Significantly, and in one embodiment of the present invention, multiple user-machine certificates 28 may be provided to tie the user to multiple computing devices 14.

Thus, for a first black box 22 (BB1) to which the user is to be tied, a first user-machine certificate 28 is provided which includes therein (PU-USER, PR-USER), where (PR-USER) in the certificate 28 is encrypted according to the black box public key (PU-BB1) to result in (PU-BB1 (PR-USER)). Accordingly, only BB1 having (PR-BB1) can obtain (PR-USER) from the first user-machine certificate 28.

Correspondingly, for a second black box 22 (BB2) to which the user is to be tied, a second user-machine certificate 28 is provided which includes therein the same (PU-USER, PR-USER). However, in the second user-machine certificate 28, (PR-USER) is encrypted according to the black box public key (PU-BB2) to result in (PU-BB2(PR-USER)). Accordingly, only BB2 having (PR-BB2) can obtain (PR-USER) from the second user-machine certificate 28.

As may now be appreciated, in the present invention, a plurality of such user-machine certificates 28 may be provided to tie a user as represented by (PU-BB, PR-BB) to a plurality of black boxes 22, each on a separate computing device 14. Thus, and as should now be appreciated, a particular license 16 is tied to a particular user as represented by (PU-USER, PR-USER), where the user may have one or more user-machine certificates 28 that each own (PR-USER), and where the license 16 has (PU-USER(KD)) therein. Each user-machine certificate 28 is tied to a particular black box 22 that owns (PR-BBx) by way of having (PU-Bx(PR-USER)) therein, and each particular black box 22 is tied to a particular computing device 14. Accordingly, and by way of each user-machine certificate 28 that owns (PR-USER), the particular license 16 is tied to every corresponding computing device 14 and is thus usable on every such corresponding computing device 14 to render the corresponding content 12.

As should now be appreciated, the ability to tie content 12 by way of a license 16 therefor to a user rather than a particular computing device 14 allows the user to render the content 12 on multiple computing devices 14. In addition, such tying allows the user to move the content 12 among the multiple computing devices 14 while still satisfying the conditions as specified within the license 16. The user is thus minimally constrained with regard to rendering the content 12, and yet the content 12 is still secure within the system 10.

Obtaining a User-Machine Certificate 28

In one embodiment of the present invention, a user-machine certificate 28 is obtained to tie a user to a particular computing device 14 among perhaps several by way of requesting such a user-machine certificate 28 from a user-machine certificate server 30 with access to a user-machine database 32 (FIG. 4). Note that the database 32 may be a dedicated database 32 or may be a portion of a larger database such as a system-wide user database or directory.

Generally, the request identifies the user and the computing device 14 and the user-machine certificate server 30 creates the user-machine certificate 28 based on information about the user in the user-machine database 32. If the user is obtaining a user-machine certificate 28 for the first time, the process is slightly altered in that the user-machine certificate server 30 must first create the information about the user in the user-machine database 32.

Figure 5:
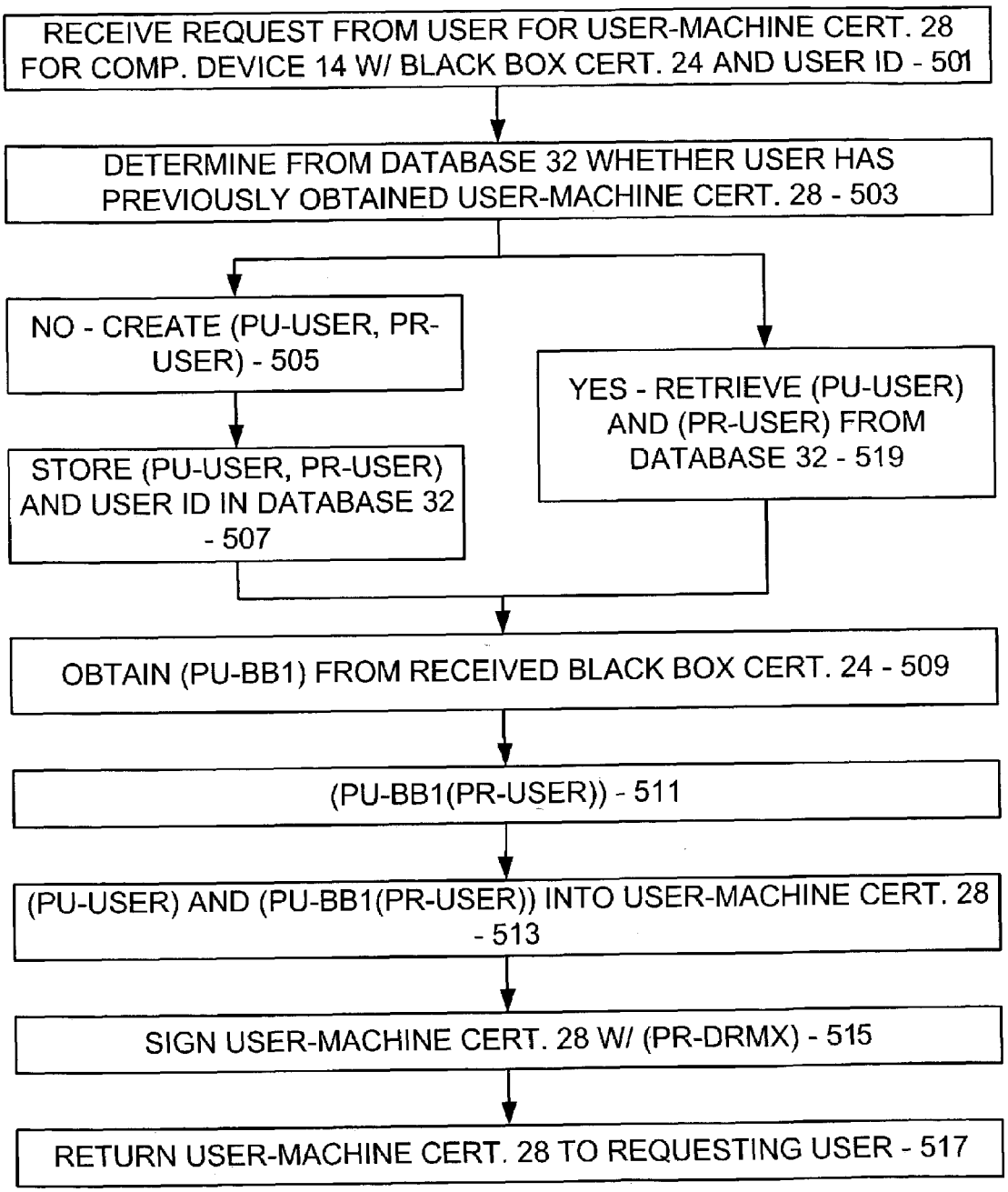
FIG. 5 is a flow diagram showing key steps performed in obtaining the user-machine certificates of FIG. 4 in accordance with one embodiment of the present invention.

In particular, and turning now to FIG. 5, it is seen that the process begins when the user-machine certificate server 30 receives a request from the user for a user-machine certificate 28 with regard to a particular computing device 14 (step 501). As may be appreciated, the request may be made by the user or may be made by the trusted component 18/black box 22 on the particular computing device 14 on behalf of the user and at the behest of the user. Significantly, the request as received by the server 30 includes the black box certificate 24 of the black box 22 (BB1, here) of the particular computing device 14, and an identification (ID) of the user. Note that the ID of the user may be any appropriate ID without departing from the spirit and scope of the present invention as long as the ID uniquely identifies the user to the server 30. For example, the ID may be an e-mail address, a network identity, a server identity, a system identity, a biometric identity, or the like.

Based on the ID, the server 30 refers to the database 32 to determine whether the user has previously obtained a user-machine certificate 28 (step 503). If so, the database 32 should be able to locate a record corresponding to the user and having the ID. If not, the database should not have any such record corresponding to the user and having the ID.

Presuming for the moment that no such record exists in the database 32 for the user, the server 30 proceeds to create such a record for the user in the database. In particular, the server 30 creates a public key/private key pair for the user (PU-USER, PR-USER) (step 505), and stores (PU-USER, PR-USER) and the ID of the user in a new record in the database 32 (step 507), perhaps along with other pertinent information such as that which is set forth below.

Thereafter, the server 30 creates the requested user-machine certificate 28 for the user by obtaining (PU-BB1) from the submitted black box certificate 24 (step 509), encrypting (PR-USER) for the user according to (PU-BB1) to result in (PU-BB1 (PR-USER)) (step 511), placing (PU-USER) and (PU-BB1 (PR-USER)) into the newly created user-machine certificate 28 for the user, perhaps along with other information including the ID of the user (step 513), and then signing the newly created user-machine certificate 28 with (PR-DRMx) (step 515) and perhaps attaching a chain of certificates for verification purposes. The newly created user-machine certificate 28 may then be returned to the requesting user (step 517).

In one embodiment of the present invention, the user-machine certificate 28 as received by the user is an XML/XrML-compliant document that includes therein:

ISSUEDTIME—The time at which the certificate 28 was created.
VALIDITYTIME—The time during with the certificate 28 is intended to be valid.
DESCRIPTOR—A unique identifier for the certificate 28.
ISSUER—The server 30, as identified by (PU-DRMx).
DISTRIBUTION POINT—An address of the server 28.
ISSUEDPRINCIPALS—(PU-USER).
SECURITYLEVELs—Flags that indicate whether the certificate 28 is permanent or temporary, and/or when the ISSUEDPRINCIPALS ID was created.
FEDERATIONPRINCIPALS—(PU-BB1 (PR-USER)).
SIGNATURE—Based on (PR-DRMx) and at least a portion of the above information.

If at a later time the user-machine certificate server 30 receives another request from the user for a user-machine certificate 28 with regard to another particular computing device 14, as at step 501, the request as received by the server 30 would include the black box certificate 24 of the black box 22 (BB2, here) of the particular computing device 14, and an identification (ID) of the user. This time, however, the server 30 in referring to the database 32 to determine whether the user has previously obtained a user-machine certificate 28 as at step 503 would find record in the database 32 corresponding to the user and having the ID. Accordingly, the server 30 would retrieve (PU-USER) and (PR-USER) from the record for the user in the database 32 (step 519)

Thereafter, and as before, the server 32 creates the requested user-machine certificate 28 for the user by obtaining (PU-BB2) from the submitted black box certificate 24 as at step 509, encrypting (PR-USER) for the user according to (PU-BB2) to result in (PU-BB2(PR-USER)) as at step 511, placing (PU-USER) and (PU-BB2(PR-USER)) into the newly created user-machine certificate 28 for the user, perhaps along with other information including the ID of the user as at step 513, and then signing the newly created user-machine certificate 28 with (PR-DRMx) as at step 515 and perhaps attaching a chain of certificates for verification purposes. The newly created user-machine certificate 28 may then be returned to the requesting user at step 517.

As may now be appreciated, the user can obtain a number of user-machine certificates 28 from the server 30, where all of the obtained certificates 28 share a common (PU-USER) and (PR-USER), but where (PR-USER) in each certificate 28 is encrypted by a (PR-BBx) of a different black box 22, thereby tying such certificate to such black box 22. Thus, a license 16 may be obtained by the user by submitting any user-machine certificate 28 of the user and is tied to the user by way of (PR-USER). Moreover, the license is tied to all of the user-machine certificates 32 of the user and therefore all of the corresponding computing devices 14, and is thus usable on every such corresponding computing device 14 to render the corresponding content 12.

Server-Side Features

The user-machine certificate server 30 and the user-machine database 32 may implement the following server-side features, among others:

Quota Function—In one embodiment of the present invention, the server 30 and database 32 in combination controls if and how a user can be associated with multiple computing devices 14. In particular, based on information in the database 32 regarding the user such as how many user-machine certificates 28 have been issued for the user and how many of such certificates 28 can be issued for the user, the server 30 can enforce a maximum number of computing devices 14 to which the user is tied by way of corresponding user-machine certificates 28. In addition, based on information in the database 32 on when each user-machine certificate 28 was issued to the user, the server 30 can enforce limits on how often certificates 28 are issued. Note that such maximums and limits are defined as policy for the server 28 by an administrator thereof, and that the server must maintain relevant information to enforce the policy in the record of the user in the database 32. Of course, such policy may be arbitrarily complex and may be any appropriate policy without departing from the spirit and scope of the present invention. As one example of policy, it may be the case that a user may be associated with a maximum number (N) of computing devices 14, but that (N) increases by 1 every 60 days.

Figure 6:
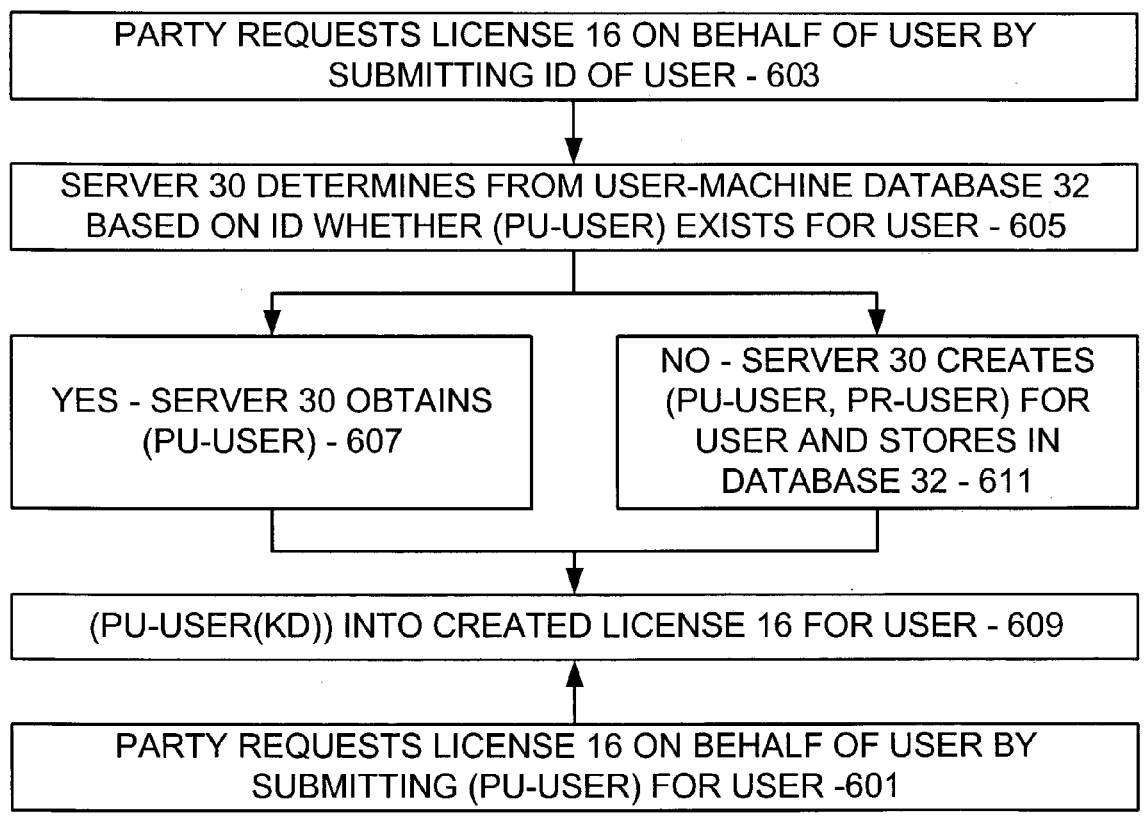
FIG. 6 is a flow diagram showing key steps performed in obtaining a license on behalf of a user in accordance with one embodiment of the present invention.

Pre-Licensing—To request a license 16 from a licensor, (PU-USER) is submitted to the licensor, typically in the form of a certificate such as a user-machine certificate 28, and the received license includes (PU-USER) encrypting the content key (KD) for the corresponding content 12 to result in (PU-USER(KD)). Such is the case when the user is the requestor. However, with the server 30 and database 32 having a record for the user with (PU-USER), and in one embodiment of the present invention, and turning now to FIG. 6, another party other than the user can request a license 16 on behalf of the user merely by submitting (PU-USER) for the user (step 601) or the ID of the user (step 603), along with other appropriate information.

Assuming that the licensor is the user-machine certificate server 30 or a server with access to such server 30, and that the submitted indicia is the ID of the user as at step 603, the server 30 would determine from the user-machine database 32 based on the ID of the user whether a record with a (PU-USER) exists for such user (step 605). If so, the server 30 obtains from such record (PU-USER) (step 607), which is then employed to create the license 16 on behalf of the user by using such (PU-USER) to encrypt the content key (KD) for the corresponding content 12 to result in (PU-USER(KD)) (step 609). The created license 16 and the corresponding content 12 may then be forwarded to the user, who can then render such content 12 with such license 16 at a computing device 14 for which the user has already obtained a corresponding user-machine certificate 28 that owns (PR-USER). Notably, such rendering can take place even though the user never requested the content 12 or the license 16, and even though the user may not currently be connected to the remainder of the DRM system 10.

In the event that the server 30 determines from the user-machine database 32 based on the ID of the user that no record with a (PU-USER) exists for the user, as at step 605, and in one embodiment of the present invention, the server 30 may create a new public key/private key pair (PU-USER, PR-USER) for the user and store same in the database 32 (step 611). Thereafter, processing continues at step 609, where the newly created (PU-USER) is employed to create the license 16 on behalf of the user. Although the user doesn't have any user-machine certificate 28 based on (PU-USER, PR-USER), the user need only identify itself to the server 30 and request such a certificate 28, as in FIG. 5.

Of course, in the event that the submitted indicia is the (PU-USER) of the user as at step 601, the database 32 need not even be consulted. Instead, such (PU-USER) is employed to create the license 16 on behalf of the user by using such (PU-USER) to encrypt the content key (KD) for the corresponding content 12 to result in (PU-USER(KD)), as at step 609. As before, the created license 16 and the corresponding content 12 may then be forwarded to the user, who can then render such content 12 with such license 16 at a computing device 14 for which the user has already obtained a corresponding user-machine certificate 28 that owns (PR-USER).

Temporary User-Machine Certificate 28—To support rendering of content 12 on a publicly shared computing device 14, and in one embodiment of the present invention, the server 30 can at user request create a temporary user-machine certificate 28 based on pre-defined policy. In particular such a temporary certificate 28 would have a relatively short VALIDITYTIME, perhaps on the order of 15-30 minutes, and may have a SECURITYLEVEL flag set to temporary. Thus, the trusted component 18 on the computing device 14 would be trusted to honor the temporary certificate 28 for only the short VALIDITYTIME, and might store the temporary certificate 28 in RAM only. Thus, after the user departs from the publicly shared computing device 14, the temporary certificate 28 either already has expired or should expire shortly, and once the RAM is erased the temporary certificate 28 is destroyed. Note, too, that a licensor may choose to not issue any license 16 to the user based on the temporary certificate 28.

Conclusion

Although the present invention is especially useful in connection with a computing device 14 such as a personal computer or the like, the present invention may be practiced with regard to any appropriate device, all without departing from the spirit and scope of the present invention, such as for example a server, an intelligent appliance, a networked portable device, etc. Accordingly, the device 14 is to be interpreted to encompass any appropriate device that has a DRM system 10 or that participates in the DRM architecture.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism to tie a digital license 16 to a user rather than a particular computing device 16 by way of a user object/certificate 28. In addition, the present invention comprises a new and useful method and mechanism to tie a user by way of the user object/certificate 28 therefor to each of a plurality of particular computing devices 14, while at the same time restricting the number of particular computing devices 14 to which any particular user object/certificate 28 is tied to. Thus, a license 16 is tied to each of a plurality of computing devices 14. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A digital rights management (DRM) system to allow a user to render digital content on a plurality of computing devices according to a corresponding digital license, the system comprising:

a first trusted component on a first one of the computing devices for performing cryptography and DRM evaluation and enforcement for the first one of the computing devices, the first trusted component being tied to the first one of the computing devices, wherein the first trusted component has a first public key/private key pair (PU-1, PR-1) associated therewith, wherein the first trusted component includes a first black box with (PR-1) and a first black box certificate, and wherein the first one of the computing devices has a first hardware ID (HWID) associated therewith and the first black box certificate includes (PU-1) and the first HWID;

a first user-machine certificate associated with the first one of the computing devices, the first user-machine certificate being tied to the ID of the user, whereby the first trusted component can obtain the content for rendering on the first one of the computing devices by way of the first user-machine certificate and the license, the license being tied to the content and to the user;

a second trusted component on a second one of the computing devices for performing cryptography and DRM evaluation and enforcement for the second one of the computing devices, the second trusted component being tied to the second one of the computing devices, wherein the second trusted component has a second public key/private key pair (PU-2, PR-2) associated therewith, wherein the second trusted component includes a second black box with (PR-2) and a second black box certificate, and wherein the second one of the computing devices has a second hardware ID (HWID) associated therewith and the second black box certificate includes (PU-2) and the first HWID; and a second user-machine certificate associated with the second one of the computing devices, the second user-machine certificate being tied to the ID of the user, whereby the second trusted component can obtain the content for rendering on the second one of the computing devices by way of the second user-machine certificate and said license, wherein the user has a public key/private key pair (PU-USER, PR-USER) associated therewith.

2. The DRM system of claim 1 wherein, the content is encrypted according to a content key (KD) to result in encrypted content (KD(content)), and the license includes (KD) encrypted according to (PU-USER) to result in encrypted content key (PU-USER(KD)), and wherein:

the first user-machine certificate includes (PU-USER) and also includes (PR-USER) encrypted according to (PU-1) to result in encrypted private key (PU-1(PR-USER)), whereby the first trusted component can apply (PR-1) to (PU-1(PR-USER)) from the first user-machine certificate to obtain (PR-USER), can apply (PR-USER) to (PU-USER(KD)) from the license to obtain (KD), and can apply (KD) to (KD(content)) to obtain the content for rendering on the first one of the computing devices;

the second user-machine certificate includes (PU-USER) and also includes (PR-USER) encrypted according to (PU-2) to result in encrypted private key (PU-2(PR-USER)), whereby the second trusted component can apply (PR-2) to (PU-2(PR-USER)) from the second user-machine certificate to obtain (PR-USER), can apply (PR-USER) to (PU-USER(KD)) from the license to obtain (KD), and can apply (KD) to (KD(content)) to obtain the content for rendering on the second one of the computing devices.

3. The digital rights management system of claim 1, wherein the license is cryptographically tied to the content and to the user.

4. A method to allow a user to render digital content on a plurality of computing devices according to a corresponding digital license, the method comprising:

providing a first trusted component on a first one of the computing devices to perform cryptography and DRM evaluation and enforcement for the first one of the computing devices, the first trusted component being tied to the first one of the computing devices, wherein the first trusted component has a first public key/private key pair (PU-1, PR-1) associated therewith, wherein the first trusted component includes a first black box with (PR-1) and a first black box certificate, and wherein the first one of the computing devices has a first hardware ID (HWID) associated therewith and the first black box certificate includes (PU-1) and the first HWID;

providing a first user-machine certificate associated with the first one of the computing devices, the first user-machine certificate being tied to the ID of the user, whereby the first trusted component can obtain the content for rendering on the first one of the computing devices by way of the first user-machine certificate and the license, the license being tied to the content and to the user;

providing a second trusted component on a second one of the computing devices for performing cryptography and DRM evaluation and enforcement for the second one of the computing devices, the second trusted component being tied to the second one of the computing devices, wherein the second trusted component has a second public key/private key pair (PU-2, PR-2) associated therewith, wherein the second trusted component includes a second black box with (PR-2) and a second black box certificate, and wherein the second one of the computing devices has a second hardware ID (HWID) associated therewith and the second black box certificate includes (PU-2) and the first HWID; and providing a second user-machine certificate associated with the second one of the computing devices, the second user-machine certificate being tied to the ID of the user, whereby the second trusted component can obtain the content for rendering on the second one of the computing devices by way of the second user-machine certificate and the license, wherein the user has a public key/private key pair (PU-USER, PR-USER) associated therewith.

5. The method of claim 4 wherein, the content is encrypted according to a content key (KD) to result in encrypted content (KD(content)), and the license includes (KD) encrypted according to (PU-USER) to result in encrypted content key (PU-USER(KD)), the method further comprising:

providing the first user-machine certificate including (PU-USER) and also including (PR-USER) encrypted according to (PU-1) to result in encrypted private key (PU-1(PR-USER)), whereby the first trusted component can apply (PR-1) to (PU-1(PR-USER)) from the first user-machine certificate to obtain (PR-USER), can apply (PR-USER) to (PU-USER(KD)) from the license to obtain (KD), and can apply (KD) to (KD(content)) to obtain the content for rendering on the first one of the computing devices; and providing the second user-machine certificate including (PU-USER) and also including (PR-USER) encrypted according to (PU-2) to result in encrypted private key (PU-2(PR-USER)), whereby the second trusted component can apply (PR-2) to (PU-2(PR-USER)) from the second user-machine certificate to obtain (PR-USER), can apply (PR-USER) to (PU-USER(KD)) from the license to obtain (KD), and can apply (KD) to (KD (content)) to obtain the content for rendering on the second one of the computing devices.

6. The method of claim 4, wherein the license is cryptographically tied to the content and to the user.

7. A method for a user to render digital content on a plurality of computing devices, the content being encrypted according to a content key (KD) to result in encrypted content (KD(content)), the user having a public key/private key pair (PU-USER, PR-USER) associated with the ID of the user, the method comprising:

obtaining a license tied to the content and to the user, the license including (KD) encrypted according to a (PU-USER) to result in encrypted content key (PU-USER (KD));

obtaining a first trusted component on a first one of the computing devices for performing cryptography and DRM evaluation and enforcement for the first one of the computing devices, the first trusted component having a first public key/private key pair (PU-1, PR-1) associated therewith, wherein the first trusted component includes a first black box with (PR-1) and a first black box certificate, and wherein the first one of the computing devices has a first hardware ID (HWID) associated therewith and the first black box certificate includes (PU-1) and the first HWID;

obtaining a first user-machine certificate associated with the first one of the computing devices, the first user-machine certificate including (PU-USER) associated with the ID of the user and also including (PR-USER) encrypted according to (PU-1) to result in encrypted private key (PU-1 (PR-USER));

applying (PR-1) to (PU-1(PR-USER)) from the first user-machine certificate to obtain (PR-USER);

applying (PR-USER) to (PU-USER(KD)) from the license to obtain (KD) at the first one of the computing devices;

applying (KD) to (KD(content)) to obtain the content for rendering on the first one of the computing devices;

obtaining a second trusted component on a second one of the computing devices for performing cryptography and DRM evaluation and enforcement for the second one of the computing devices, the second trusted component having a second public key/private key pair (PU-2, PR-2) associated therewith, wherein the second trusted component includes a second black box with (PR-2) and a second black box certificate, and wherein the second one of the computing devices has a second hardware ID (HWID) associated therewith and the second black box certificate includes (PU-2) and the first HWID;

obtaining a second user-machine certificate associated with the second one of the computing devices, the second user-machine certificate including (PU-USER) associated with the ID of the user and also including (PR-USER) encrypted according to (PU-2) to result in encrypted private key (PU-2(PR-USER));

applying (PR-2) to (PU-2(PR-USER)) from the second user-machine certificate to obtain (PR-USER);

applying (PR-USER) to (PU-USER(KD)) from the license to obtain (KD) at the second one of the computing devices; and applying (KD) to (KD(content)) to obtain the content for rendering on the second one of the computing devices.

8. A method in combination with a digital rights management (DRM) system to allow a particular user to render digital content on a particular computing device according to a corresponding digital license, the method for providing a user-machine certificate associated with the particular computing device and tied to the ID of the particular user, the method comprising:

receiving a request from the user for the user-machine certificate with regard to the computing device, the request including an identification (ID) of the user and a computing device certificate associated with the computing device, the computing device certificate including a public key (PU-x) associated with the computing device;

determining based on the ID of the user whether the user has a record in a user-machine database;

if the record does not exist, creating the record for the user in the database, the record including the ID of the user and a public key/private key pair for the user (PU-USER, PR-USER);

if the record does exist, locating the record for the user in the database;

obtaining (PU-x) from the computing device certificate associated with the computing device;

encrypting (PR-USER) according to (PU-x) to result in encrypted private key (PU-x(PR-USER));

forming (PU-USER) and (PU-x(PR-USER)) into the to-be-provided user-machine certificate; and returning the formed user-machine certificate to the user, whereby the content is encrypted according to a content key (KD) to result in encrypted content (KD(content)), the license being tied to the content and to the user and including (KD) encrypted according to (PU-USER) to result in encrypted content key (PU-USER(KD)), and a first trusted component of the computing device having a private key (PR-x) corresponding to (PU-x) can decrypt the content for rendering on the computing device by applying (PR-x) to (PU-x(PR-USER)) from the user-machine certificate to obtain (PR-USER), applying (PR-USER) to (PU-USER(KD)) from the license to obtain (KD), and applying (KD) to (KD (content)) to obtain the content, wherein the first trusted component includes a first black box with (PR-x) and a first black box certificate, and wherein the computing devices has a first hardware ID (HWID) associated therewith and the first black box certificate includes (PU-x) and the first HWID.

9. The method of claim 8 comprising further forming into the to-be-provided user-machine certificate a time at which the user-machine certificate is created, and a time during which the user-machine certificate is intended to be valid.

10. The method of claim 8 comprising further forming into the to-be-provided user-machine certificate a flag indicating whether the user-machine certificate is permanent or temporary.

11. The method of claim 8 further comprising signing the formed user-machine certificate prior to returning same to the user.

12. The method of claim 8 to allow a particular user to render the digital content on each of a plurality of computing devices according to the corresponding digital license, the method comprising:

receiving a plurality of requests from the user, each request for a user-machine certificate with regard to a particular one of the computing devices, the request including an identification (ID) of the user and a computing device certificate associated with the particular one of the computing devices, the computing device certificate including a public key (PU-x) associated with the particular one of the computing devices;

for each request:

determining based on the ID of the user the public key/private key pair for the user (PU-USER, PR-USER);

obtaining (PU-x) from the computing device certificate associated with the request;

encrypting (PR-USER) according to the obtained (PU-x) to result in encrypted private key (PU-x(PR-USER));

forming (PU-USER) and (PU-x(PR-USER)) into the to-be-provided user-machine certificate corresponding to the request; and returning the formed user-machine certificate to the user, whereby a second trusted component of any of the computing devices can decrypt the content for rendering on the computing device by applying (PR-x) to (PU-x(PR-USER)) from the corresponding user-machine certificate to obtain (PR-USER), applying (PR-USER) to (PU-USER(KD)) from the license to obtain (KD), and applying (KD) to (KD(content)) to obtain the content.

13. The method of claim 8 comprising determining based on pre-defined whether the user-machine certificate is to be provided to the user and providing such user-machine certificate only if the pre-defined policy allows.

14. The method of claim 13 comprising enforcing a maximum number of computing devices for which the user is to be provided with a corresponding user-machine certificate.

15. The method of claim 13 comprising enforcing how often a user-machine certificate can be provided to the user.

16. A method of providing a digital license to a requestor requesting such license on behalf of a user to allow the user to render corresponding digital content according to the digital license, the content being encrypted according to a content key (KD) to result in encrypted content (KD(content)), the method comprising:

receiving an identification (ID) of the user from the requestor;

determining from a database based on the ID of the user whether a record with a public key for the user (PU-USER) exists for such user;

if the record does not exist, creating the record for the user in the database, the record including the ID of the user and a public key/private key pair for the user (PU-USER, PR-USER);

if the record does exist, locating the record for the user in the database;

employing (PU-USER) to encrypt the content key (KD) for the content to result in encrypted content key (PU-USER(KD));

forming (PU-USER(KD)) into the to-be-provided license, where the to-be-provided license is tied to the content and to the user; and returning the formed license to the requestor, whereby the requestor forwards the license to the user, and the user having (PR-USER) can decrypt the content by applying (PR-USER) to (PU-USER to (PU-USER(KD)) from the license to obtain (KD), and applying (KD) to (KD(content)) to obtain the content, whereby a trusted component on a computing device can obtain the content for rendering on the computing device by way of user machine certificate and the license, wherein the user-machine certificate is associated the computing device, the user-machine certificate being tied to the ID of the user, wherein the trusted component has a public key/private key pair (PU-1, PR-1) associated therewith, wherein the trusted component includes a first black box with (PR-1) and a first black box certificate, and wherein the computing device has a first hardware ID (HWID) associated therewith and the first black box certificate includes (PU-1) and the first HWID.

* * * * *